(12) United States Patent
Kasterstein et al.

(10) Patent No.: US 9,665,647 B2
(45) Date of Patent: May 30, 2017

(54) SYSTEM AND METHOD FOR INDEXING MOBILE APPLICATIONS

(71) Applicant: Doat Media Ltd., Tel Aviv (IL)

(72) Inventors: Rami Kasterstein, Givataim (IL);
Amihay Ben-David, London (GB);
Joey Joseph Simhon, Ramat-Gan (IL)

(73) Assignee: Doat Media Ltd., Tel Aviv (IL)

( * ) Notice: Subject to any disclaimer, the term of this patent is extended or adjusted under 35 U.S.C. 154(b) by 159 days.

(21) Appl. No.: 14/278,223

(22) Filed: May 15, 2014

(65) Prior Publication Data

US 2014/0250098 A1    Sep. 4, 2014

Related U.S. Application Data

(63) Continuation-in-part of application No. 13/712,563, filed on Dec. 12, 2012, now Pat. No. 9,141,702, which is a continuation-in-part of application No. 13/156,999, filed on Jun. 9, 2011, now Pat. No. 9,323,844, and a continuation-in-part of application No. 13/296,619, filed on Nov. 15, 2011, application No. 14/278,223, which is a continuation-in-part of application No. 13/156,999, filed on Jun. 9, 2011, now Pat. No. 9,323,844, and a continuation-in-part of application No. 13/296,619, filed on Nov. 15, 2011, (Continued)

(51) Int. Cl.
*G06F 17/30* (2006.01)

(52) U.S. Cl.
CPC .. *G06F 17/30864* (2013.01); *G06F 17/30716* (2013.01); *G06F 17/30867* (2013.01)

(58) Field of Classification Search
CPC ............ H04L 67/306; G06F 17/30905; G06F 17/30864; G06F 17/30716; G06F 17/30867; G06F 17/30684; G06F 3/0482; G06F 3/04817; G06F 3/04847
USPC .................................. 707/706; 715/205, 602
See application file for complete search history.

(56) References Cited

U.S. PATENT DOCUMENTS

| | | | |
|---|---|---|---|
| 5,911,043 | A | 6/1999 | Duffy et al. |
| 6,101,529 | A | 8/2000 | Chrabaszcz |

(Continued)

FOREIGN PATENT DOCUMENTS

| | | |
|---|---|---|
| EP | 2288113 A1 | 2/2011 |
| JP | 2009278342 | 11/2009 |

(Continued)

OTHER PUBLICATIONS

*Alice Corp.* v. *CLS Bank International*, 573 U.S. _, 134 S. Ct. 2347 (2014).*

(Continued)

*Primary Examiner* — Evan Aspinwall
(74) *Attorney, Agent, or Firm* — M&B IP Analysts, LLC

(57) ABSTRACT

A system and method for indexing applications accessible through a user device are provided. The system includes crawling through a plurality of data sources to detect applications accessible through a user device; for each detected application, generating metadata characterizing the application; analyzing the generated metadata to classify the application to at least one category; and updating an application index to include at least the index application and the respective classified category.

19 Claims, 4 Drawing Sheets

Related U.S. Application Data and a continuation-in-part of application No. 14/103,536, filed on Dec. 11, 2013, now Pat. No. 9,552,422, which is a continuation-in-part of application No. 13/712,563, filed on Dec. 12, 2012, now Pat. No. 9,141,702, which is a continuation-in-part of application No. 13/156,999, filed on Jun. 9, 2011, now Pat. No. 9,323,844, and a continuation-in-part of application No. 13/296,619, filed on Nov. 15, 2011.

(60) Provisional application No. 61/826,047, filed on May 22, 2013, provisional application No. 61/653,562, filed on May 31, 2012, provisional application No. 61/468,095, filed on Mar. 28, 2011, provisional application No. 61/354,022, filed on Jun. 11, 2010.

(56) References Cited

U.S. PATENT DOCUMENTS

| | | |
|---|---|---|
| 6,484,162 B1 | 11/2002 | Edlund et al. |
| 6,564,213 B1 | 5/2003 | Ortega et al. |
| 6,605,121 B1 | 8/2003 | Roderick |
| 7,266,588 B2 | 9/2007 | Oku |
| 7,302,272 B2 | 11/2007 | Ackley |
| 7,461,061 B2 | 12/2008 | Aravamudan et al. |
| 7,529,741 B2 | 5/2009 | Aravamudan et al. |
| 7,533,084 B2 | 5/2009 | Holloway et al. |
| 7,636,900 B2 | 12/2009 | Xia |
| 7,707,142 B1 | 4/2010 | Ionescu |
| 7,774,003 B1 | 8/2010 | Ortega et al. |
| 7,792,815 B2 | 9/2010 | Aravamudan et al. |
| 7,966,321 B2 | 6/2011 | Wolosin et al. |
| 7,974,976 B2 | 7/2011 | Yahia et al. |
| 8,032,666 B2 | 10/2011 | Srinivansan et al. |
| 8,073,860 B2 | 12/2011 | Venkataraman et al. |
| 8,086,604 B2 | 12/2011 | Arrouye et al. |
| 8,271,333 B1 | 9/2012 | Grigsby et al. |
| 8,312,484 B1 | 11/2012 | McCarty et al. |
| 8,571,538 B2 | 10/2013 | Sprigg et al. |
| 8,606,725 B1 | 12/2013 | Agichtein et al. |
| 8,700,804 B1 | 4/2014 | Meyers et al. |
| 8,718,633 B2 | 5/2014 | Sprigg et al. |
| 8,793,265 B2 | 7/2014 | Song et al. |
| 8,799,273 B1 | 8/2014 | Chang et al. |
| 8,825,597 B1 | 9/2014 | Houston et al. |
| 8,843,853 B1 | 9/2014 | Smoak et al. |
| 2004/0186989 A1 | 9/2004 | Clapper |
| 2004/0229601 A1 | 11/2004 | Zabawskyj et al. |
| 2005/0071328 A1 | 3/2005 | Lawrence |
| 2005/0076367 A1 | 4/2005 | Johnson et al. |
| 2005/0102407 A1 | 5/2005 | Clapper |
| 2005/0108406 A1 | 5/2005 | Lee et al. |
| 2005/0149496 A1 | 7/2005 | Mukherjee et al. |
| 2005/0243019 A1 | 11/2005 | Fuller et al. |
| 2005/0283468 A1 | 12/2005 | Kamvar et al. |
| 2006/0004675 A1 | 1/2006 | Bennett et al. |
| 2006/0031529 A1 | 2/2006 | Keith |
| 2006/0064411 A1 | 3/2006 | Gross et al. |
| 2006/0129931 A1 | 6/2006 | Simons et al. |
| 2006/0136403 A1 | 6/2006 | Koo |
| 2006/0200761 A1 | 9/2006 | Judd et al. |
| 2006/0224593 A1 | 10/2006 | Benton et al. |
| 2006/0248062 A1 | 11/2006 | Libes et al. |
| 2006/0265394 A1 | 11/2006 | Raman et al. |
| 2006/0277167 A1 | 12/2006 | Gross et al. |
| 2007/0011167 A1 | 1/2007 | Krishnaprasad et al. |
| 2007/0055652 A1 | 3/2007 | Hood et al. |
| 2007/0082707 A1 | 4/2007 | Flynt et al. |
| 2007/0174900 A1 | 7/2007 | Marueli et al. |
| 2007/0195105 A1 | 8/2007 | Koberg |
| 2007/0204039 A1 | 8/2007 | Inamdar |
| 2007/0239724 A1* | 10/2007 | Ramer ............ G06F 17/30864 |
| 2007/0255831 A1 | 11/2007 | Hayashi et al. |
| 2007/0300185 A1 | 12/2007 | Macbeth et al. |
| 2008/0065685 A1 | 3/2008 | Frank |
| 2008/0104195 A1 | 5/2008 | Hawkins et al. |
| 2008/0114759 A1 | 5/2008 | Yahia et al. |
| 2008/0256443 A1 | 10/2008 | Li et al. |
| 2009/0049052 A1 | 2/2009 | Sharma et al. |
| 2009/0070318 A1 | 3/2009 | Song et al. |
| 2009/0077047 A1* | 3/2009 | Cooper ............... G06F 17/2785 |
| 2009/0125482 A1 | 5/2009 | Peregrine et al. |
| 2009/0210403 A1 | 8/2009 | Reinshmidt et al. |
| 2009/0234814 A1 | 9/2009 | Boerries et al. |
| 2009/0240680 A1 | 9/2009 | Tankovich et al. |
| 2009/0265328 A1 | 10/2009 | Parekh et al. |
| 2009/0277322 A1 | 11/2009 | Cai et al. |
| 2009/0327261 A1* | 12/2009 | Hawkins .......... G06F 17/30864 |
| 2010/0042912 A1 | 2/2010 | Whitaker |
| 2010/0082661 A1 | 4/2010 | Beaudreau |
| 2010/0106706 A1 | 4/2010 | Rorex et al. |
| 2010/0184422 A1 | 7/2010 | Ahrens |
| 2010/0228715 A1 | 9/2010 | Lawrence |
| 2010/0257552 A1 | 10/2010 | Sharan et al. |
| 2010/0268673 A1 | 10/2010 | Quadracci |
| 2011/0072492 A1 | 3/2011 | Mohler et al. |
| 2011/0078767 A1 | 3/2011 | Cai et al. |
| 2011/0093488 A1 | 4/2011 | Amacker et al. |
| 2011/0225145 A1 | 9/2011 | Greene et al. |
| 2011/0252329 A1 | 10/2011 | Broman |
| 2011/0264656 A1 | 10/2011 | Dumais et al. |
| 2011/0314419 A1 | 12/2011 | Dunn et al. |
| 2012/0158685 A1 | 6/2012 | White et al. |
| 2012/0198347 A1 | 8/2012 | Hirvonen et al. |
| 2013/0132896 A1 | 5/2013 | Lee et al. |
| 2013/0290319 A1 | 10/2013 | Glover et al. |
| 2014/0025502 A1 | 1/2014 | Ramer et al. |
| 2014/0049651 A1 | 2/2014 | Voth |
| 2014/0279013 A1 | 9/2014 | Chelly et al. |
| 2015/0032714 A1 | 1/2015 | Simhon et al. |

FOREIGN PATENT DOCUMENTS

| | | |
|---|---|---|
| JP | 20090285550 A1 | 11/2009 |
| JP | 2011044147 | 3/2011 |

OTHER PUBLICATIONS

Foreign Office Action for JP2015-537680 dated Dec. 6, 2016 from the Japanese Patent Office.

Kurihara, et al., "How to Solve Beginner's Problem, Mac Fan Supports" Mac Fan, Mainichi Communications Cooperation, Dec. 1, 2009, vol. 17, 12th issue, p. 92.

Notice of the First Office Action for Chinese Patent Application No. 201280004300.6, State Intellectual Property Office of the P.R.C., dated Oct. 26, 2016.

Kurihara, et al., "How to Solve Beginner's Problem, Mac Fan Supports" Mac Fan, Mainichi Communications Cooperation, Dec. 1, 2009, vol. 17, 12th issue, p. 92, Translated.

Chinese Foreign Action dated Mar. 13, 2017 from the State Intellectual Property of the P.R.C. for Chinese Patent Application: 201280004301.0, China.

* cited by examiner

SYSTEM AND METHOD FOR INDEXING MOBILE APPLICATIONS

CROSS-REFERENCE TO RELATED APPLICATIONS

This application claims the benefit of U.S. Provisional Application No. 61/826,047 filed on May 22, 2013. This application is a continuation-in-part (CIP) of:

(a) U.S. patent application Ser. No. 13/712,563 filed on Dec. 12, 2012, now pending. The Ser. No. 13/712,536 application claims the benefit of Provisional Application No. 61/653,562 filed on May 31, 2012, and is a CIP of U.S. patent application Ser. No. 13/156,999, filed Jun. 9, 2011, now pending, and U.S. patent application Ser. No. 13/296,619, filed Nov. 15, 2011, now pending. The Ser. No. 13/156,999 application claims the benefit of U.S. Provisional Application No. 61/468,095 filed on Mar. 28, 2011, and U.S. Provisional Application No. 61/354,022 filed on Jun. 11, 2010;

(b) U.S. patent application Ser. No. 13/156,999 filed on Jun. 9, 2011, now pending. The Ser. No. 13/156,999 application claims the benefit of U.S. Provisional Application No. 61/468,095 filed on Mar. 28, 2011, and U.S. Provisional Application No. 61/354,022 filed on Jun. 11, 2010;

(c) U.S. patent application Ser. No. 13/296,619 filed on Nov. 15, 2011, now pending; and (d) U.S. patent application Ser. No. 14/103,536 filed on Dec. 11, 2013, now pending. The Ser. No. 14/103,536 application claims the benefit of U.S. Provisional Application No. 61/822,376 filed on May 12, 2013, and is a CIP of U.S. patent application Ser. No. 13/712,563, referenced above.

All of the applications referenced above are herein incorporated by reference.

TECHNICAL FIELD

The present invention relates generally to search engines for providing one or more search results respective of a query received from a user and, more specifically, to systems and methods for detecting user intent respective of a query and providing applications respective of user intent.

BACKGROUND

Search engines are used for searching for information over the World Wide Web. A web search query refers to a query that a user enters into a web search engine in order to receive search results.

A query received from a user device may be explicit or implicit in different levels. An implicit query makes it complicated to provide appropriate search results to the user because the user intent is unclear. As an example, if the user's query is "Madonna clips" it is unclear whether the user is interested in listening to the entertainer Madonna music clips, viewing Madonna's video clips or downloading Madonna's clips to the user's device.

In general, web search engines generate large databases and indexes of websites and webpages accessible on the WWW, in a process known as web crawling. Such databases and indexes are updated frequently as websites and webpages are added, deleted, and changed very frequently on the WWW. The databases of a web search engine may include information regarding each webpage in the databases, such as the actual words on the webpage, and the index usually includes information relating to how a webpage should be classified and indexed in the databases. The indexing of webpages is based on the contents of a webpage, metadata and tags defined by the web-page designers.

When a user submits a search query to a web search engine, the web search engine uses its indexing system to determine which webpages in its databases match the search query with which it was provided. The web search engine may be able to rank the webpages in its databases which most closely match the search query with which it was provided. The webpages which most closely match the search query are returned to the user and usually presented in the form of a list, also known as search results, a search results list, or even an "answer" to a user's search query.

In conventional search engines, such as Google® and Bing, an input query is checked only against the indexes and databases maintained by the search engine. That is, a search query input to Google's search engine will be fully served by Google's databases and indexes and will not be relayed to other engines (e.g., to retrieve the result).

The indexing of web contents is limited in many aspects. For example, the indexing directly relates to contents of the webpages, as such webpages are not indexed to serve specific interests of users seeking for information. In addition, the search engines are limited to search only their index database, thus search results across difference resources cannot be retrieved.

With the widespread use of smartphones these days, users search for mobile applications (also referred to as 'apps') and contents provided through such apps. The conventional indexing solutions are not usually designed to index mobile applications or, more specifically, contents that can be retrieved through such applications.

It would therefore be advantageous to provide a solution that would overcome the deficiencies of the conventional indexing solutions.

SUMMARY

Certain exemplary embodiments disclosed herein include a system and method for indexing applications accessible through a user device. The method comprises crawling through a plurality of data sources to detect applications accessible through a user device; for each detected application, generating metadata characterizing the application; analyzing the generated metadata to classify the application to at least one category; and updating an application index to include at least the index application and the respective classified category.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
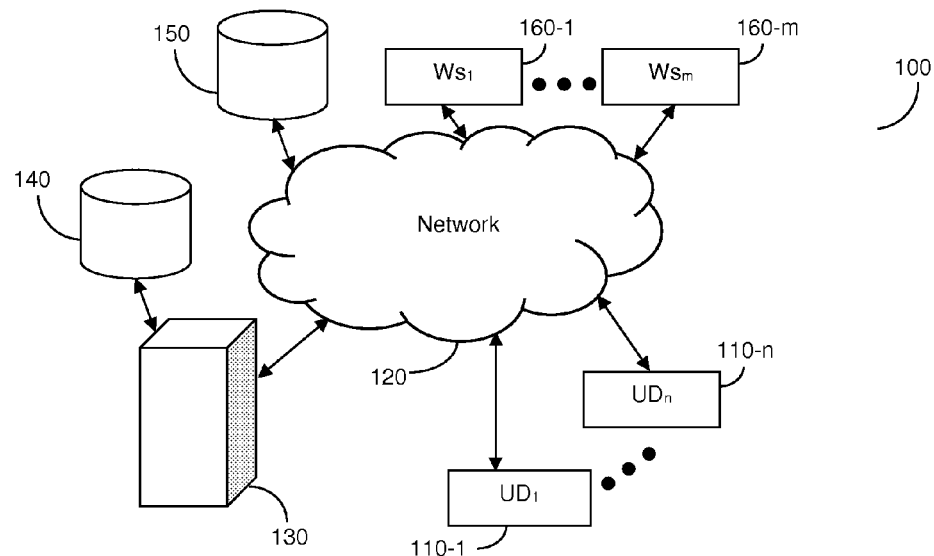
FIG. 1 is a schematic diagram of the operation of the system in accordance with an embodiment.

It is important to note that the embodiments disclosed herein are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a system and methods for indexing applications to queries. The system is configured to receive a query from a user device. A query may be, but is not necessarily limited to, a set of typed words, a voice command, and the like. The received query may be implicit or explicit. The system is then configured to generate metadata respective of the received query and determine the user intent. Respective of the user intent, the system is then configured to classify the at least one query to one or more categories, each category serves a different topic of user intents. The system is then configured to provide one or more appropriate applications respective of the at least one query.

FIG. 1 shows an exemplary and non-limiting schematic diagram of a system 100 utilized to describe certain embodiments disclosed herein. A plurality of user devices 110-1 through 110-n (collectively referred hereinafter as user devices 110 or individually as a user device 110, merely for simplicity purposes) are connected to a network 120. The network 120 may be, but is not limited to, a local area network (LAN), a wide area network (WAN), a metro area network (MAN), the world wide web (WWW), the Internet, a wired network, a wireless network, and the like, as well as any combination thereof. The user devices 110 are configured to submit queries to a server 130 which is also connected to the network 120. The server 130 is configured to send the received queries to and from an intent detection unit (IDU) 140.

The IDU 140 is configured to determine the user's intent respective of a query or part of a query received from the user through the user device 110. Determination of user intent is further described in co-pending U.S. patent application Ser. No. 14/103,536 filed on May 12, 2013, titled "A System and Methods for Detecting User Intent", assigned to the common assignee, which is hereby incorporated by reference for all that it contains. The user's intent represents the type of content, the content, and/or actions that may be of interest to the user for a current time period. The IDU 140 may be further configured to send the determined user's intent to the server 130.

A user's intent may be determined based on, e.g., a query entered by a user into an engine. User intents may range from general intents (e.g., "games") to more narrow intents (e.g., "Angry Birds®," "tactical games," "games involving animals"). Queries may further include one or more tokenized portions, wherein each tokenized portion represents a meaningful entity. Entities are physical or conceptual items bearing known types and attributes such as, but not limited to, products, people, locations, groups, theories, facts, virtual spaces, and so on. Types may describe an entity and can be used in identifying user intent. As a non-limiting example, the entity "Madonna" may bear types including, but not limited to, singer, director, actor, and celebrity.

Tokenized portions may be compared and contrasted to determine a user's intent. Specifically, matching types among multiple tokenized portions may indicate that the user's intent is related to such types. As a non-limiting example, a user may enter the query "madonna warren beatty". The query may be broken down into tokenized portions "madonna" and "warren beatty." Both Madonna and Warren Beatty are associated with the type "actor." Thus, the user's intent may be determined to be related to actors. Specifically, the user's intent may be determined to be "movies featuring the actors Madonna and Warren Beatty." The movie "Dick Tracy®" is a movie featuring both of these actors. As a result, a Wikipedia® article or a YouTube® video of the "Dick Tracy®" movie may be provided to a user based on the user's intent depending on the category of the query Categorization of queries is described further herein below with respect to FIG. 2.

The system 100 may further include a database 150 for storing information such as prior user intents, prior queries received from a user, data for enhancing the search experience, applications' classification, etc. A plurality of web sources 160-1 through 160-m (collectively referred hereinafter as web sources 160 or individually as a web source 160, merely for simplicity purposes) are further connected to the network 120. The web sources 160 may include "cloud-based" applications; that is, applications executed by servers in a cloud-computing infrastructure such as, but not limited to, a private-cloud, a public-cloud, or any combination thereof. The cloud-computing infrastructure is typically realized through a data center.

Applications are typically installed on the user devices 110 or suggested to be installed by the server 130. The server 130 is configured to crawl through the applications existing in the web sources 160 as well as through the applications installed on the user devices 110 and the suggested applications. According to certain embodiments, the server 130 is configured to generate metadata respective of the applications. Such metadata may be, for example, the name of the application, the application bundle name, the application description, the application score, content of the application, a portion thereof, a combination thereof, and so on. In an embodiment, the metadata is then analyzed by the server 130 and the applications are determined to be either appropriate or inappropriate to serve one or more categories of queries, wherein each category serves a different topic of user intents. According to another embodiment, one or more additional categories may be generated dynamically respective of user intents as further described herein below with respect to FIGS. 2 and 4.

In an embodiment, an appropriate application may be provided to the user. In a further embodiment, such applications are provided to the user as virtual applications. Virtual applications are applications which run within a browser embedded in another program, thereby permitting users to utilize virtual versions of applications without downloading such applications directly.

The determination of which one or more applications of the plurality of applications are appropriate to serve one or more categories of queries is stored in the database 150 for further use. According to one embodiment, upon receiving a query from a user through a user device 110, the IDU 140 is configured to determine the user intent. The system 100 then classifies the query into one or more categories respective of the user's intent and provides the appropriate applications to the user device 110 respective of the query.

Techniques for providing appropriate applications are described in more detail herein below with respect to FIG. 4. According to another embodiment, the system is capable of providing one or more appropriate applications to the user device 110 based on the analysis of metadata related to the user regardless of the user intent.

The system 100 may further include an agent installed locally on the user devices 110 that enable a local crawling of a search through the content of the user devices 110. The various elements of the system 100 are further described in co-pending U.S. patent application Ser. No. 13/156,999 titled "SYSTEM AND METHODS THEREOF FOR ENHANCING A USER's SEARCH EXPERIENCE", assigned to the common assignee, which is hereby incorporated by reference for all that it contains.

Figure 2:
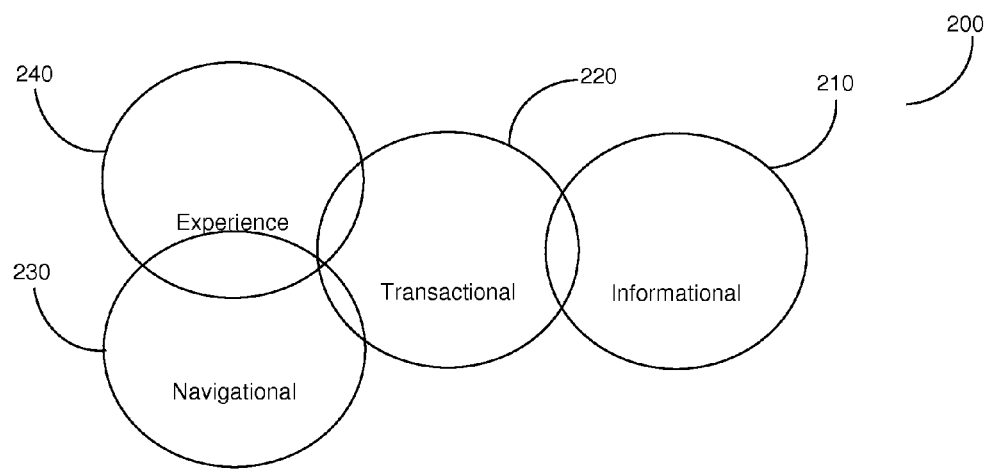
FIG. 2 is a schematic block diagram of exemplary applications categories according to an embodiment.

FIG. 2 depicts an exemplary and non-limiting schematic diagram 200 of exemplary queries' categories according to an embodiment. Informational category 210 generally includes one or more queries that comprise a specific question. As an example, such an informational query may be "Who won the NBA championship in 2003?" By analyzing the query and determining the user intent, the system 100 is configured to match one or more appropriate applications to the query. As an example, such applications may be the Wikipedia® website, the IMDB® web application, an ESPN® application in sport related matters, applications that enable local search through the contact list of the user device 110, and so on. As a non-limiting example, in response to the query "Who won the NBA championship in 2003?", the user's intent may be determined to be seeking information regarding NBA championship history. In response, an appropriate application may be determined to be a Wikipedia® or ESPN® article about the NBA championship.

Transactional category 220 typically includes one or more queries that require additional actions following the execution of a corresponding one or more applications in order to be appropriately served, for example, playing a video within a video stream website, purchasing tickets through a tickets purchasing applications, and the like. Examples of such applications include the YouTube® application, the Ticketmaster® website, and so on. According to one embodiment, applications that are determined as appropriate to serve queries that classified to the transactional category 220 may be provided with one or more search results respective of the query, for example, if the query received is "watch Madonna's new video clip," the stream of the new Madonna's video clip through YouTube® application may be provided to the user device 110 rather than the YouTube® main web page.

The navigational category 230 generally includes one or more queries that specifically mention the name and/or the designated functionality of the application. The one or more queries classified to the navigational category 230 explicitly indicate the user intent. An example for such query may be "PDF reader", "scanner", and so on. Applications determined as appropriate to server queries classified to the navigational category may be, for example, photos galleries, alarm clock applications, etc.

According to another embodiment, an experience category 240 may also be determined based on the user intent. The experience category may include, for example, queries such as "games for five minutes." The user intent based on such a query is determined as quick games and, therefore, a server (e.g., the server 130) may provide such quick games to the user device 110. A person of ordinary skill in the art would readily appreciate that the queries described in FIG. 2 may be clustered without departing from the scope of the disclosed embodiments and, therefore, several applications may be included in several categories.

Figure 3:
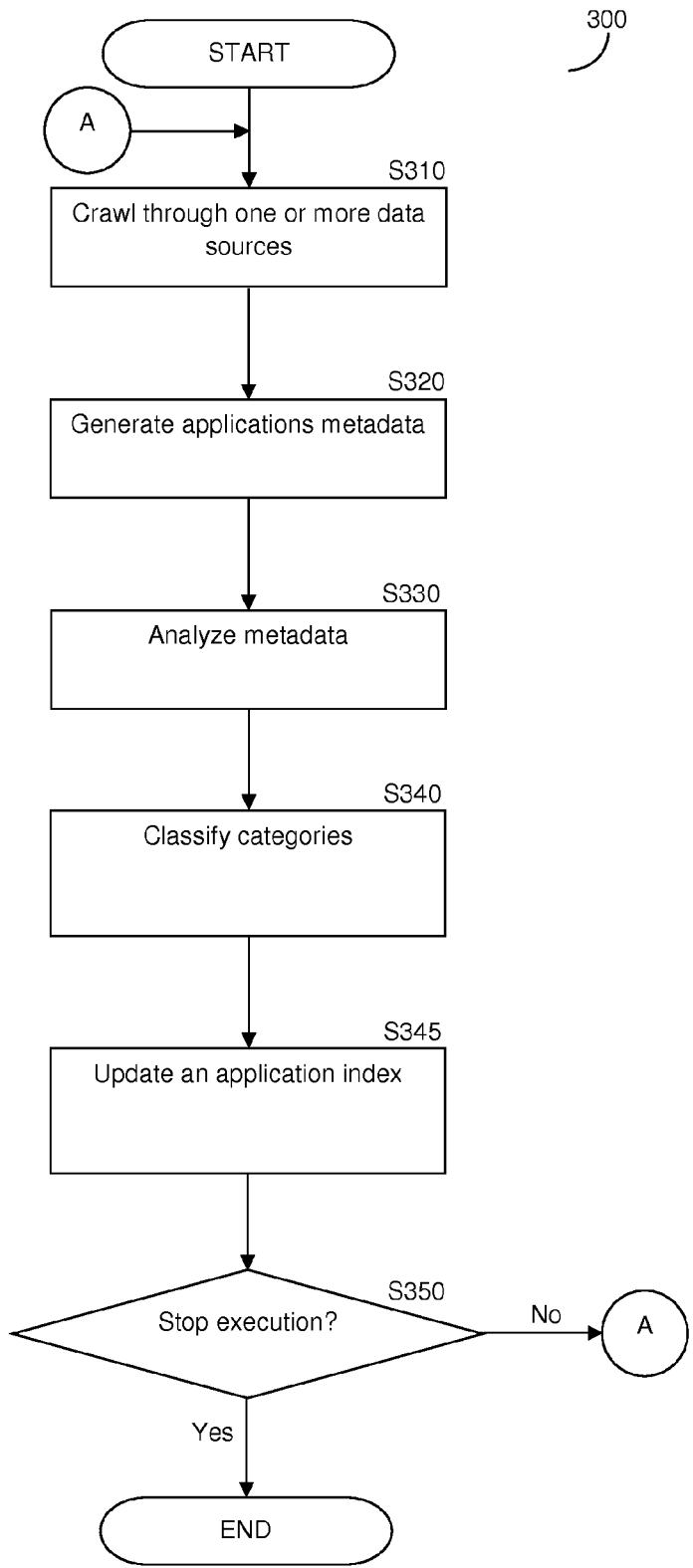
FIG. 3 is a flowchart illustrating the operation of indexing applications according to an embodiment.

FIG. 3 is an exemplary and non-limiting flowchart 300 of a method for indexing applications according to one embodiment. The method may be performed by the server 130. In S310, a crawling procedure is performed through a plurality of data sources to identify mobile applications. A data source may be each one of the user devices 110, the web sources 160, the database 150, or combinations thereof. In an embodiment, a data source may be repository for storing such applications, e.g., AppStore®, GooglePlay®, and the like. In S320, metadata respective of the identified applications is generated. Such metadata may be, for example: the name of the application, the application bundle name, the application description, the application score, applications' URL, deep URLs, and so on. Deep URLs are links to contents that can be viewed or retrieved through the application. For example, an application for recipes, the deep URLs may direct to the recipes offered by the application.

In S330, the metadata is analyzed to classify the application to one or more categorizes. The analysis of the metadata includes, for example, textual analysis of the application's description, the application bundle name, and/or name. The analysis may include querying external databases to determine the category to classify the application. In one embodiment, the crawling process further crawls through deep-URLs listed in the metadata. The contents that can be retrieved through such URLs can be indexed and analyzed.

In S340, based on the analysis of the metadata, the identified applications are determined as appropriate to serve one or more categories of queries. Determination of appropriateness is discussed further herein below with respect to FIG. 5. In S345, an application index is updated. The index lists each application detected by the crawler and the categories that the applications are classified to. The index may also include an appropriateness score indicating how good the application can serve a certain category. In another embodiment, the index includes for each indexed application is associated metadata including, for example, application name, application type, application ID, URLs and deep URLs that activate the application, and more.

The application index may be saved in the database. Alternatively, the index may be locally saved in the device. The index may be updated based on usage of the applications and/or queries submitted by users.

In S350, it is checked whether additional applications should be indexed and if so, execution continues with S310; otherwise, execution terminates.

Figure 4:
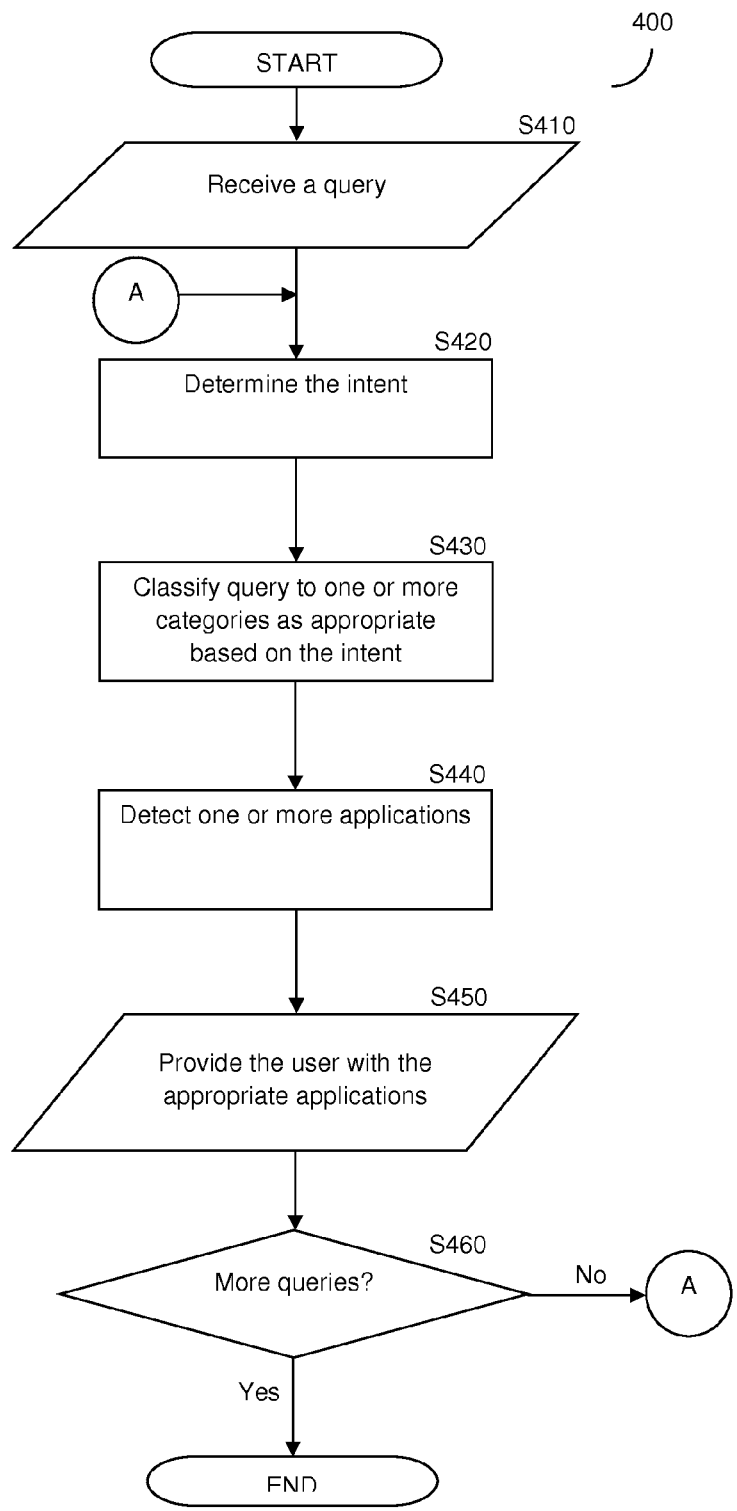
FIG. 4 is a flowchart describing the operation of providing appropriate applications to queries based on user intent according to an embodiment.

FIG. 4 depicts an exemplary and non-limiting flowchart 400 of a method for providing appropriate applications to queries based on user intent according to one embodiment. In S410, a query, or a portion thereof, is received from a user device (e.g., user device 110). In S420, the user intent is determined by the IDU 140. In S430, based on the determined intent, the query is classified into one or more categories.

In S440, the application index generated, as discussed above, is searched to detect one or more applications that can appropriately serve the categories determined for the query. In an embodiment, the search returned only applications indexed with an appropriateness score above a predefined threshold. In another embodiment, applications indexed to the same categories as to the input query are returned to the user.

In S450, the matching applications are provided to the user device 110. The matching applications, i.e., search results may be displayed in a form of icons representing the matching applications being rendered and displayed on the user device. A matching application may be a "native application" and/or a "virtual application" in the browser of the native application. A native application (or app) is installed and executed on the user device. A virtual application (app) is executed on a server and only relevant content is rendered and sent to the user device. In an exemplary embodiment, content is relevant if it relates to the user's current activity. For example, if a virtual version of an app that displays content from a video streaming website is executed while a user is engaged in or attempting to view a particular video, only content that is relevant to that video would be displayed on the user device. In an embodiment, the virtual app results include contents addressed by indexed deep URLs. For example, for the query "sushi and seaweed", a sushi recipe offered by the recipe application (mentioned) above will be returned to the user. In an embodiment, different icons can represent different type of icons. It should be noted that the search results, which may include both virtual and native apps, address the user's intent.

In S460, it is checked whether additional queries have been received and, if so, execution continues with S420; otherwise, execution terminates.

It should be appreciated that the operation of the method for indexing applications as described in FIG. 3 and the operation of providing appropriate applications to queries based on the user intent as described in FIG. 4 may be integrated without departing from the scope of the disclosed embodiments.

Figure 5:
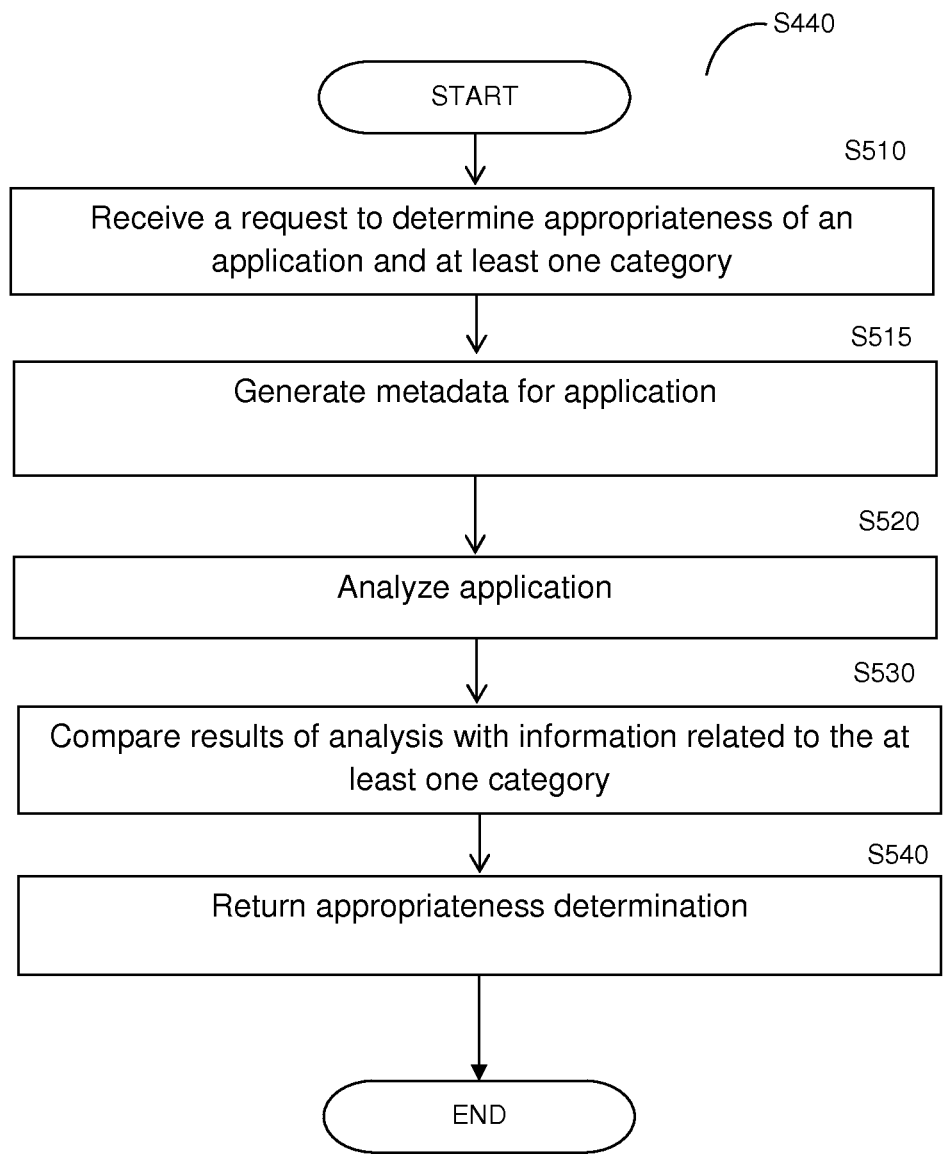
FIG. 5 is a flowchart illustrating a method for determining whether applications are appropriate for serving one or more categories based on user intent according to an embodiment.

FIG. 5 is an exemplary and non-limiting flowchart S440 illustrating a method for determining whether applications are appropriate for serving categories based on the user intent according to one embodiment. In S510, a request to determine appropriateness of an application and at least one categorization are received. In various embodiments, in S515, metadata is generated for the application. Such metadata may be, for example, the name of the application, the application bundle name, the application description, the application score, content of the application, a combination thereof, and so on.

In S520, the application is analyzed. In embodiments where metadata is generated, analysis of the application may include analysis of metadata. Analysis of the application may be utilized to determine, e.g., what types of entities are included in the application, whether the application returns multimedia content (e.g., videos, music, images, etc.), whether the application is interactive (e.g., a game), statistics or parameters related to content featured in the application, and whether content included in the application is suitable for a given age group.

In S530, the results of the analysis are compared to the at least one provided category. In an embodiment, categories may be associated with certain analysis results. For example, an informational category (e.g., informational category 210) may be associated with applications that return text-based information and, in particular, information that is relevant to a particular query. Similarly, a transactional category (e.g., transactional category 220) may be associated with applications that require additional actions following application execution to be appropriately served such as, e.g., video streaming applications, social media applications, and shopping applications.

Navigational categories (e.g., navigational category 230) may be associated with applications whose description metadata matches the query (e.g., "PDF reader," "scanner," and so on). An experience category (e.g., experience category 240) may be associated with applications whose content bears statistics or parameters that correspond to a requirement buried in a query (e.g., the YouTube® application may be associated with the category of the query "short clips," as YouTube® videos are generally shorter in length than, for example, Netflix® streaming content).

In a non-limiting embodiment, applications may be determined as more or less appropriate for a given query's category based on relevance to the query. As a non-limiting example, a user may provide the query "Who won the 2003 NBA championship?" The category of this query is determined to be informational. Applications such as Wikipedia® and ESPN® may be determined to be appropriate for this category based on the presence of articles related to NBA news included in each. Based on statistics demonstrating relative content of each application, however, ESPN® may be determined to be more appropriate for the given query. Thus, in an embodiment, the ESPN® application may be returned to the user rather than the Wikipedia® application.

In an exemplary embodiment, the appropriateness results may be quantized to provide an appropriateness score. The score may be represented using a numerical number, e.g., 0-10, a percentage, and the like. In S540, the appropriateness results determined in S530 are returned.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method, implemented by a computing device, for indexing applications accessible through a user device, comprising:
   crawling through a plurality of data sources to detect applications accessible through a user device;
   for each detected application, generating metadata characterizing the application;
   analyzing the generated metadata to classify the application to at least one category;
   updating an application index to include at least the indexed application and the respective classified category;
   crawling through deep uniform resource locators (URLs) of each detected application;
   indexing contents addressed by the deep URLs; and
   saving the indexed contents in the application index;
   wherein each category indicates a different topic of possible user intents.

2. The method of claim 1, wherein the application index is stored in at least one of: remotely in a database and locally in the user device.

3. The method of claim 1, wherein the metadata is at least one of: the name of the application, the application bundle name, the application description, the application score, an activation URL of the application, and deep URLs of the application.

4. The method of claim 3, wherein analyzing the generated metadata further comprising: performing textual analysis on the name of the application, the application bundle name, and the application description.

5. The method of claim 4, further comprising:
   analyzing contents addressed by the deep URLs.

6. The method of claim 1, further comprising:
   searching for at least one application that matches at least a user intent, wherein the search is performed using the application index.

7. The method of claim 6, wherein searching for the at least one application further comprising:
   analyzing at least a query received from the user device;
   determining a user intent based on the analysis;
   classifying the query to at least one category based on the determined user intent;
   matching the at least one category of the query to the at least one category of each indexed application; and
   returning the at least one matching application to the user device.

8. The method claim 7, wherein the at least one matching application is returned as at least one any one of: a native application and a virtual application.

9. The method of claim 1, wherein the query is one of: a free text query and a structured query.

10. A non-transitory computer readable medium having stored thereon instructions for causing one or more processing units to execute the computerized method according to claim 1.

11. A system for indexing applications accessible through a user device, comprising:
    an interface to a network for accessing plurality of data sources over the network;
    a processor; and
    a memory coupled to the processor, wherein the memory contains instructions that, when executed by the processor, configure the system to:
    crawl through a plurality of data sources to detect applications accessible through a user device;
    for each detected application, generate metadata characterizing the application;
    analyze the generated metadata to classify the application to at least one category;
    update an application index to include at least the index application and the respective classified category;
    crawl through deep uniform resource locators (URLs) of each detected application;
    index contents addressed by the deep URLs; and
    save the indexed contents in the application index;
    wherein each category indicates a different topic of possible user intents.

12. The system of claim 11, wherein the application index is stored in at least one of: remotely in a database and locally in the user device.

13. The system of claim 11, wherein the metadata is at least one of: the name of the application, the application bundle name, the application description, the application score, an activation URL of the application, and deep URLs of the application.

14. The system of claim 13, wherein the system is further configured to: perform textual analysis on the name of the application, the application bundle name, and the application description.

15. The system of claim 13, wherein the system is further configured to: analyze contents addressed by the deep URLs.

16. The system of claim 11, wherein the system is further configured to: search for at least one application that matches at least a user intent, wherein the search is performed using the application index.

17. The system of claim 11, wherein the system is further configured to:
    analyze at least a query received from the user device;
    determine the user intent based on the analysis;
    classify the query to at least one category based on the determined user intent;
    match the at least one category of the query to the at least one category of each indexed application; and
    return the at least one matching application to the user device.

18. The system of claim 17, wherein the at least one matching application is returned as at least one any one of: a native application and a virtual application.

19. The system of claim 11, wherein the query is one of: a free text query and a structured query.

* * * * *